US012487244B2

(12) United States Patent
Heim et al.

(10) Patent No.: US 12,487,244 B2
(45) Date of Patent: Dec. 2, 2025

(54) METHOD AND KIT FOR TESTING POTENCY OF IMMUNOGLOBULIN COMPOSITIONS

(71) Applicant: Biotest AG, Dreieich (DE)

(72) Inventors: Katharina Heim, Dreieich (DE); Marcus Gutscher, Dreieich (DE)

(73) Assignee: Biotest AG, Dreieich (DE)

( * ) Notice: Subject to any disclaimer, the term of this patent is extended or adjusted under 35 U.S.C. 154(b) by 982 days.

(21) Appl. No.: 17/612,130

(22) PCT Filed: Jun. 5, 2020

(86) PCT No.: PCT/EP2020/065568
§ 371 (c)(1),
(2) Date: Nov. 17, 2021

(87) PCT Pub. No.: WO2020/245327
PCT Pub. Date: Dec. 10, 2020

(65) Prior Publication Data
US 2022/0229069 A1    Jul. 21, 2022

(30) Foreign Application Priority Data

Jun. 7, 2019 (EP) .................................... 19178939

(51) Int. Cl.
*G01N 33/68* (2006.01)
*A61K 35/16* (2015.01)
*G01N 33/569* (2006.01)

(52) U.S. Cl.
CPC ......... *G01N 33/6854* (2013.01); *A61K 35/16* (2013.01); *G01N 33/56944* (2013.01)

(58) Field of Classification Search
CPC ..... G01N 33/6854; A61K 35/16; C07K 16/00
See application file for complete search history.

(56) References Cited

U.S. PATENT DOCUMENTS

| 2009/0214547 A1* | 8/2009 | Sorensen | ................ | A61P 31/00 424/139.1 |
| 2011/0020355 A1* | 1/2011 | Ratner | ................... | C07K 16/12 424/139.1 |
| 2020/0124602 A1* | 4/2020 | Böse | ..................... | G01N 33/569 |

FOREIGN PATENT DOCUMENTS

| WO | 2006021210 A2 | 3/2006 |
| WO | 2010071986 A1 | 7/2010 |
| WO | 2010095917 A1 | 8/2010 |
| WO | 2018175783 A1 | 9/2018 |

OTHER PUBLICATIONS

Glinz, W., et al., "Polyvalent immunoglobulins for prophylaxis bacterial infections in patients following multiple trauma," Intensive Care Medicine, vol. 11 (1985), pp. 288-294.
Hirst, R. A., et al., "The role of pneumolysin in pneumococcal pneumonia and menigitis," Clin. Exp. Immunol., vol. 138 (2004), pp. 195-201.
Keller, Margaret A., et al., "Passive Immunity in Prevention and Treatment of Infectious Diseases," vol. 13, No. 4 (2000), pp. 602-614.
Korchev, Yuri E., et al., "A conserved tryptophan in pneumolysin is a determinant of the characteristics of channels formed by pneumolysin in cells and planar lipid bilayers," Biochm. J., vol. 329 (1998), pp. 571-577.
Lawrence, Sara L., et al., "Crystal structure of Streptococcus pneumoniae pneumolysin provides key insights into early steps of pore formation," Scientific Reports, 5:14352 (2015) (13 pages).
Li, Hongen, et al., "Insights into structure and activity of natural compound inhibitors of pneumolysin," Scientific Reports, 7:42015 (2017) (8 pages).
Garcia-Suarez, Maria Del Mar, et al., "The role of pneumolysin in mediating lung damage in a lethal pneumococcal pneumonia murine model," Respiratory Research, vol. 8, No. 3 (2007) (10 pages).
Norcross, Erin W., et al., "Active Immunization with Pneumolysin versus 23-Valent Polysaccharide Vaccine for *Streptococcus pneumoniae* Keratitis," Investigative Ophthalmology & Visual Science, vol. 51, No. 12 (2011), pp. 9232-9243.
Paton, James C., et al., "Effect of Immunization with Pneumolysin on Survival Time of Mice Challenged with *Streptococcus Pneumoniae*," Infection and Immunity, vol. 40, No. 2 (1983), pp. 548-552.
Perez, Elena E., et al., "Update on the use of immunoglobulin in human disease: A review of evidence," J. Allergy Clin. Immunol., vol. 139, No. 3 (2017) (46 pages).
Shak, Joshua R., et al., "Novel Role for the *Streptococcus pneumoniae* Toxin Pneumolysin in the Assembly of Biofilms," MBio, vol. 4, Issue 5 (2013) (10 pages).
Van Der Poll, Tom, et al., "Pathogenesis, treatment, and prevention of pneumococcal pneumonia," The Lalancet.com, vol. 374 (2009), pp. 1543-1556.
Van Pee, Katharina, et al., "CryoEM structures of membrane pore and prepore complex reveal cytolytic mechanism of Pneumolysin," eLife 23644 (2017) (22 pages).
Welte, Tobias, et al., Efficacy and safety of trimodulin, a novel polyclonal antibody preparation, in patients with severe community-acquired pneumonia: a randomized, placebo-controlled, double-blind, multicenter, phase II trial (CIGMA study), Intensive Care Med No. 44 (2018), pp. 438-448.

(Continued)

*Primary Examiner* — Changhwa J Cheu
(74) *Attorney, Agent, or Firm* — Pabst Patent Group LLP

(57) ABSTRACT

The present invention relates to the field of immunotherapeutics. It provides a method for characterisation and quality control, in particular for determining the potency of an immunoglobulin composition comprising immunoglobulins derived from a plurality of human donors, the method comprising contacting the immunoglobulin composition with pneumolysin, adding erythrocytes to the immunoglobulin composition and determining lysis of the erythrocytes. The invention also provides a corresponding use of pneumolysin, as well as a kit and composition useful in said method. The method can be used for quality control of immunoglobulin concentrate, e.g., of an IgM-containing immunoglobulin composition comprising IgM, IgA and IgG antibodies, and in a method of preparing an immunoglobulin composition. The immunoglobulin compositions obtainable from said method may be used, e.g., in the treatment of pneumonia, e.g., severe community-acquired pneumonia, which may be caused, e.g., by *Streptococcus pneumoniae*.

18 Claims, 6 Drawing Sheets

(56) References Cited

OTHER PUBLICATIONS

Figure 2A:
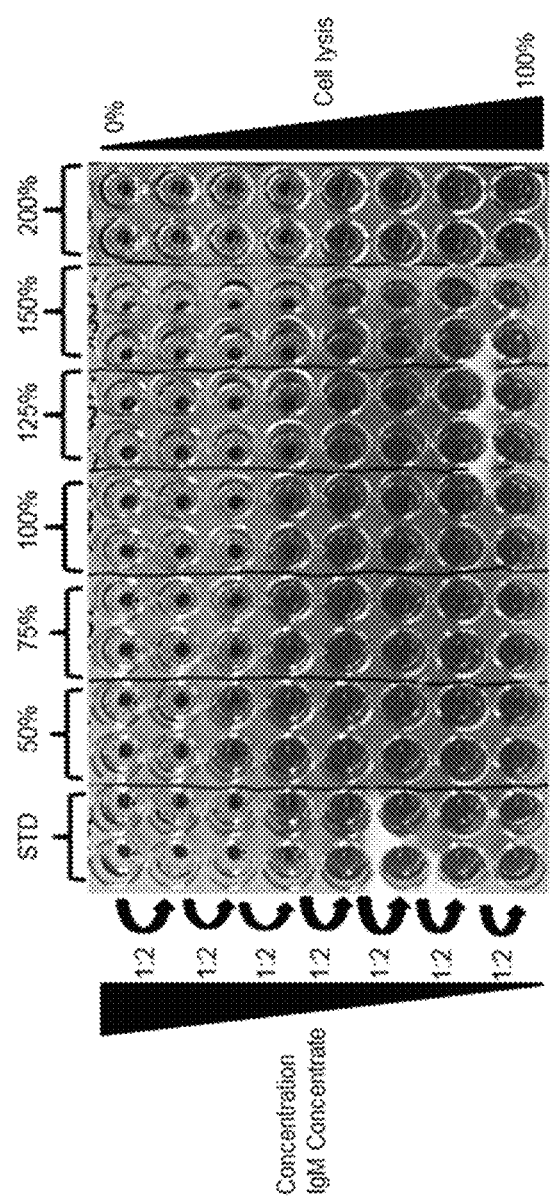

International Preliminary Report on Patentability, PCT/EP2020/065568, mailed Dec. 7, 2021 (11 pages).
European Search Report issued for application 19178939.5, dated May 12, 2019.
International Search Report issued for PCT/Ep2020/065568, dated Jul. 3, 2020.
Bokori-Brown et al., Red Blood Cell Susceptibility to Pneumolysin, ASBMB vol. 291, No. 19, p. 10210-10227, 2016.
De Los Toyos et al., Functional Analysis of Pneumolysin by Use of Monoclonal Antibodies, Infection and Immunity, vol. 64, No. 2, p. 480-484, 1996.
Garcia et al., Retention of neutralising activity by recombinant anti-pneumolysin antibody fragments, FEMS Immunology and Medical Microbiology, 22, p. 225-231, 1998.
Garcia-Suarez et al., Protection against Pneumococcal Pneumonia in Mice by Monoclonal Antibodies to Pneumolysin, Infection and Immunity, vol. 72, No. 8, p. 4534-4540, 2004.
Kirkham et al., Otitis-Prone Children Produce Functional Antibodies to Pneumolysin and Pneumococcal Polysaccharides, Clinical Immunology, vol. 24, Issue 3, 1-12, 2017.
Martner et al., *Streptococcus pneumoniae* Autolysis Prevents Phagocytosis and Production of Phagocyte-Activating Cytokines, Infection and Immunity, vol. 77, No. 9, p. 3826-3837, 2009.
Musher et al., Nonspecificity of Assaying for IgG Antibody to Pneumolysin in Circulating Immune Complexes as a Means to Diagnose Pneumococcal Pneumonia, CID, 32, p. 534-538, 2001.
Suarez-Alvarez et al., Characterisation of mouse monoclonal antibodies for pneumolysin: fine epitope mapping and V gene usage, Immunology Letters, 88, p. 227-239, 2003.
Yamaguchi et al., *Streptococcus pneumoniae* Invades Erythrocytes and Utilizes Them to Evade Human Innate Immunity, PLOS One, vol. 8, Issue 10, e77282, 1-11, 2013.
Zvirbliene et al., Production and characterization of monoclonal antibodies against vaginolysin: Mapping of a region critical for its cytolytic activity, Toxicon 56, p. 19-28, 2010.

* cited by examiner

FIG. 1

METHOD AND KIT FOR TESTING POTENCY OF IMMUNOGLOBULIN COMPOSITIONS

The present invention relates to the field of immunotherapeutics, in particular to a method for characterization and/or quality control, in particular for determining the potency of an immunoglobulin composition comprising immunoglobulins derived from a plurality of human donors. The method comprises contacting the immunoglobulin composition with pneumolysin, adding erythrocytes to the immunoglobulin composition and determining lysis of the erythrocytes. The invention also provides a corresponding use of pneumolysin, as well as a kit and composition useful in said method. The method can be used for characterization and/or quality control of immunoglobulin compositions, e.g., of immunoglobulin compositions comprising IgM, IgA and IgG antibodies, and in a method of preparing immunoglobulin compositions. The immunoglobulin compositions obtainable from said method may be used, e.g., in the treatment of pneumonia, e.g., severe community-acquired pneumonia, which may be caused, e.g., by *Streptococcus pneumoniae.*

Antibodies or immunoglobulins have been used for the prevention and treatment of infectious diseases for a long time. While antibiotics supplanted a lot of the early uses of antibodies in treatment of bacterial infections, there are many diseases and disorders in which plasma-derived immunoglobulin compositions can play a crucial role in treatment. Such polyclonal immunoglobulin compositions have neutralizing activities against infectious agents such as bacteria, viruses and their toxins, as well as immunomodulatory properties. Treatment of bacterial infections, e.g., in pneumococcal infection, diphtheria, pertussis, tetanus, botulism, staphylococcal infection, *pseudomonas* infection, or sepsis. Immunoglobulin compositions are currently e.g. used in passive immunization for the prevention of measles, hepatitis A, hepatitis B, tetanus, varicella, rabies and vaccinia. Intravenous immunoglobulin can be used to treat certain viral infections, e.g., in immunocompromised patients (e.g., cytomegalovirus, parvovirus B19, and enterovirus infections). Immunoglobulin compositions may also be of value in toxic shock syndrome, Ebola virus, and refractory staphylococcal infections (Keller et al., 2000. Clin Microbiol Rev. 13(4): 602-614).

Immunodeficient patients, e.g., patients who do not generate antibodies in protective levels, such as patients with primary immunodeficiency, e.g., patients with IgG, IgA and/or IgM deficiencies, can particularly benefit from administration of immunoglobulins for general prevention of infections (Perez et al. 2017, J Allergy Clin Immunol. 139:S1-46).

There are also secondary immunodeficiencies. E.g. patients experiencing severe stress associated with trauma, extensive surgery, or intensive care have profound susceptibility to infection and develop a spectrum of immune deficiencies including cutaneous anergy, phagocytic dysfunction, hypogammaglobulinemia, and transiently impaired antibody function (Glinz et al., 1985, Intensive Care Med. 11:288-294). Administration of plasma-derived immunoglobulins, in particular, concentrated immunoglobulin compositions, can be beneficial.

Suitable immunoglobulin compositions are typically derived from the plasma or serum of a plurality of donors. Most commercial immunoglobulin compositions contain mainly IgG, but some contain also IgM and IgA, such as Pentaglobin (Biotest AG). Pentaglobin is a composition treated with beta-propiolactone.

Immunoglobulin compositions been found to be beneficial in the field of intensive care medicine. E.g., in a recent phase II trial, the adjunctive administration of a novel immunoglobulin composition comprising IgM, IgA, and IgG has been implicated with a reduced mortality in certain patient groups suffering from severe pneumonia, in particular severe community acquired pneumonia (sCAP). (Welte et al., 2018. Intensive Care Med. 44(4):438-448, WO 2017/157850 A1).

Infectious agents associated with pneumonia, in particular, community-acquired pneumonia include *Streptococcus pneumoniae, Haemophilus influenzae, Mycoplasma pneumoniae, Chlamydophila pneumoniae* and *Legionella pneumophila.* Several vaccines are available against *S. pneumoniae,* e.g., against polysaccharides or polysaccharide-protein conjugates (van der Poll et al., 2009. Lancet 374: 1543-1556, Norcross et al., 2011. Investigative Ophtalmology & Vival Science 52(12):9232-9241). Passive immunization with monoclonal antibodies to pneumolysin, a cytolysin produced by *Streptococcus pneumoniae* (De los Toyos et al., 1996, Infection and Immunity 64: 480-484, Mar Garcia et al., 1998, FEMS Immunology and Medical Microbiology 22:225-231, Mar Garcia et al., 2004, Infect Immun. 72(8): 4534-4540), has been shown to prevent inflammation (Mar Garcia-Suarez et al., 2007. Respiratory Research 8:3). Vaccination with pneumolysin has also been found to be lead to protection against *Streptococcus pneumoniae* infection, including generation of antibodies capable of inhibiting the cytolysis mediated by the pneumolysin (Paton et al. 1983, Infection and Immunity 40(2): 548-552, Hirst et al., 2004. Clin Exp Immunol 138:195-201).

Suitable antibodies may be administered in the form of human or animal plasma or serum. More typically, however, they are administered as purified immunoglobulin compositions for intravenous, subcutaneous or intramuscular use, for example as human IVIG (intravenous immunoglobulin) from healthy, infected or immunized donors. Most available compositions contain purified IgG, but there are also immunoglobulin compositions comprising not only IgG, but also IgM and IgA (e.g. WO 2011/131786 A2 and WO 2011/131787 A2).

Immunoglobulins from animal sources can lead to immune responses in a human subject, and their use is, therefore, limited.

One of the challenges that remains, in particular for immunoglobulin product derived from a plurality of donors, is the improved monitoring of the functional integrity and standardisation of the product. IgG, and particularly IgM, are large molecules perceptible to heat, shear stress, enzymatic degradation and other influences during manufacturing. They may be exposed to purification steps such as filtration, low pH treatment, and precipitation and treatment with octanoic acid. An important part of the function of immunoglobulins is mediated by specific binding with target antigens and by effector functions involving binding to receptors and complement factors. Despite stringent controls in manufacturing and even in the absence of changes to the molecule visible in standard analytics, there is a need to ensure that no conformational changes or other modifications have occurred that would affect the biological activity of the immunoglobulin. Further, donor pools differ, e.g., in regard to their prior exposure to a specific antigen, and in consequence, in regard to the content of antibodies directed to said antigen, both qualitatively and quantitatively. WO 2011/131787 A2 for example determines the presence and absence of antibodies to specific bacterial antigens by ELISA. However, it is silent about assays testing the functional potency of the antibody product. The skilled person is thus faced with the problem of improved monitoring of the functional integrity and activity of plasma derived immunoglobulin compositions, in particular immunoglobulin compositions derived from a plurality of donors.

SUMMARY OF THE INVENTION

This problem is solved by the present invention, in particular, by the subject matter of the claims. The present invention provides, in a first embodiment, a method for characterisation and/or quality control of an immunoglobulin composition comprising at least 30 g/L immunoglobulins derived from a plurality of human donors, the method comprising
 a) contacting the immunoglobulin composition with pneumolysin,
 b) mixing erythrocytes with the immunoglobulin composition of step a) to obtain a mixture, e.g., adding erythrocytes to the immunoglobulin composition of step a) to obtain a mixture,
 c) determining lysis of the erythrocytes.

Thereby, the properties and quality, in particular, the potency of said immunoglobulin composition can be determined. The degree of lysis of the erythrocytes is inversely correlated to the quality or the potency of the immunoglobulin composition.

As a second embodiment, the invention provides use of pneumolysin for characterisation and/or quality control of an immunoglobulin composition comprising at least 30 g/L immunoglobulins derived from a plurality of human donors. The potency may be determined by the method described herein.

In a third embodiment, in any of the preceding embodiments, it is unknown for at least one of said plurality of donors if said donor has had previous contact with *S. pneumoniae* or pneumolysin In a fourth embodiment, in any of the preceding embodiments, the immunoglobulin composition comprises IgG, IgM and/or IgA, preferably, all three classes, preferably wherein the percentage of IgM is about 18-28%, e.g., about 23% IgM, and/or the percentage of IgA is 16-26%, e.g., about 21%, and/or the percentage of IgG is 51-61%, e.g., about 56%.

In a fifth embodiment, in any of the preceding embodiments, the immunoglobulin composition substantially does not comprise immunoglobulin modified with alkylating agents, e.g. beta-propiolactone.

In a sixth embodiment, in any of the preceding embodiments, the immunoglobulin composition is derived from plasma or serum, optionally, plasma.

For the method of the invention, the immunoglobulin composition is typically titrated before step a), preferably, in the range of 0.02 g/L to 2.7 g/L.

In a sixth embodiment, in any of the preceding embodiments, the pneumolysin is *Streptococcus pneumoniae* serotype 4 pneumolysin, wherein, preferably, the pneumolysin is recombinant full length pneumolysin expressed in *E. coli*.

Alternatively, in a seventh embodiment, in any of embodiments one to five, the pneumolysin is *Streptococcus pneumoniae* serotype 2 pneumolysin, wherein, preferably, the pneumolysin is recombinant full length pneumolysin expressed in *E. coli*.

In an eighth embodiment, in any of the preceding embodiments, the concentration of pneumolysin is 0.06 to 5 µg/ml, wherein, if the pneumolysin is serotype 2 pneumolysin, the concentration preferably is 0.25-10 µg/m L, and, if the pneumolysin is serotype 4 pneumolysin, the concentration preferably is 0.01-0.67 µg/m L.

In a ninth embodiment, in any of the preceding embodiments, step a) is carried out at 37° C. for 15 min to 24 h, preferably, for 20-60 min, or 30-35 min.

In a tenth embodiment, in any of the preceding embodiments, the erythrocytes are selected from a group comprising human erythrocytes, sheep red blood cells, and rabbit red blood cells, wherein the concentration preferably is 1-4.5% (v/v) erythrocytes. Human erythrocytes are preferred, e.g., human erythrocytes of blood group 0rr.

In an eleventh embodiment, in any of the preceding embodiments, the mixture of step b) is incubated at 37° C. for 5 min to 48 h, e.g., 15 min to 24 h, preferably, for 40-120 or 60-70 min.

In a twelfth embodiment, in any of the preceding embodiments, the lysis of the erythrocytes is determined by detecting a haemoglobin-based method, e.g., the concentration of haemoglobin in a centrifugation supernatant of the mixture of b at 370-590 nm, wherein the concentration is preferably detected at about 405 nm.

In a thirteenth embodiment, in any of embodiments 1-11, the lysis of the erythrocytes is determined by a cyanmethaemoglobin-based method.

In a fourteenth embodiment, in any of the preceding embodiments, steps a) to b) are carried out in samples with different concentrations of the immunoglobulin composition, preferably with a constant concentration of pneumolysin.

In a fifteenth embodiment, in embodiment 14, a dose response curve is determined based on the samples with different concentrations of the immunoglobulin composition and, preferably, the analysis of potency is carried out based on a shift of the dose-response curve, e.g., using parallel line assessment.

The invention also provides, as a sixteenth embodiment, a method for determining potency of an immunoglobulin composition comprising at least 30 g/L immunoglobulins derived from a plurality of donors, comprising carrying out the method for characterisation and quality control of any of the previous embodiments.

In a seventeenth embodiment, in any of the preceding embodiments, the potency of the immunoglobulin composition is compared to the potency of a standard immunoglobulin composition, preferably, to a standard IgM-containing immunoglobulin composition, and the ratio of the potency of the immunoglobulin composition to the potency of the standard immunoglobulin composition is the relative potency.

The invention also provides, as an eighteenth embodiment, a method for preparing a standardized immunoglobulin composition comprising at least 30 g/L immunoglobulins derived from a plurality of human donors, comprising
 i. pooling plasma or serum derived from a plurality of human donors to provide a pool;
 ii. isolating and concentrating immunoglobulins from the pool to produce an immunoglobulin composition;
 iii. testing quality of said immunoglobulin composition of step ii) by the method of embodiment 17, wherein said immunoglobulin composition is discarded if the relative potency of said immunoglobulin composition is not in a predetermined range, e.g., of 50-200%; and
 iv. optionally, adapting the potency of the immunoglobulin composition to a desired potency; and/or
 v. packaging an amount of the immunoglobulin composition, optionally, an amount having a desired potency.

The invention also provides, as a nineteenth embodiment, a kit for carrying out the method of the invention, comprising pneumolysin, a standard immunoglobulin composition comprising at least 30 g/L immunoglobulins derived from a plurality of human donors, preferably, IgM-containing immunoglobulin composition, a detergent selected from the group comprising Triton X-100 and saponin, and a buffer in which erythrocytes are not lysed, e.g., PBS, wherein the kit optionally further comprises erythrocytes.

The invention also provides, as a twentieth embodiment, a composition comprising a standard immunoglobulin composition, preferably, an IgM-containing immunoglobulin composition, and pneumolysin, wherein the composition optionally further comprises erythrocytes. Preferably, said composition comprises at least 30 g/L immunoglobulins derived from a plurality of human donors.

The invention also provides, as a twenty-first embodiment, an immunoglobulin composition comprising at least 30 g/L immunoglobulins derived from a plurality of human donors standardized to a desired potency, preferably, the relative potency of 50-200%, by the method of any of the invention, wherein the immunoglobulin composition preferably is obtainable from the method of embodiment 18. Said immunoglobulin composition may be for use in the treatment or prevention of an infection with *S. pneumoniae*, preferably, in the treatment or prevention of severe community acquired pneumonia.

The invention also provides, as an twenty-second embodiment, a plurality of charges or batches of an immunoglobulin composition, comprising immunoglobulins derived from a plurality of human donors, wherein all charges have a potency in the same range determined by the method of the invention, e.g., with a variation below 10%.

The scope of the present invention is not limited by the embodiments above. Further embodiments, elements, modifications and advantages of the present invention will become apparent to the skilled person from the description as a whole and the skilled person is aware that features of different embodiments, elements and modifications can be suitably combined.

FIGURE LEGENDS

Figure 1:
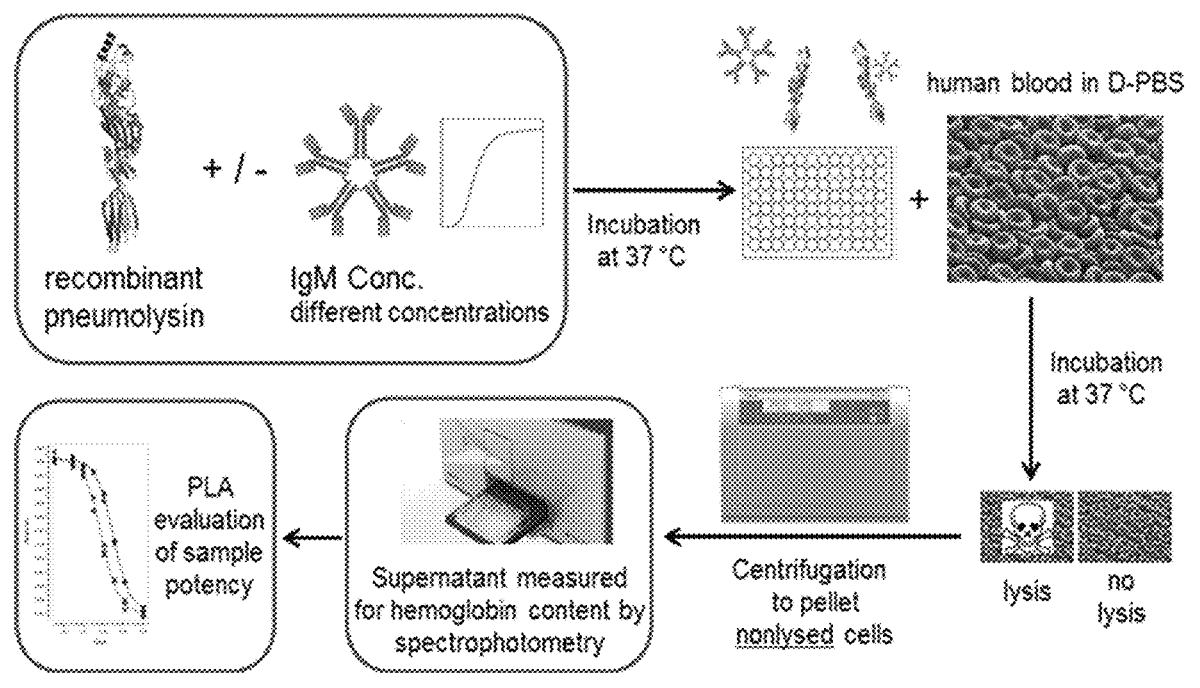

FIG. 1 shows the principle and certain preferred conditions of the characterisation and quality control assay of the invention.

Figure 2B:
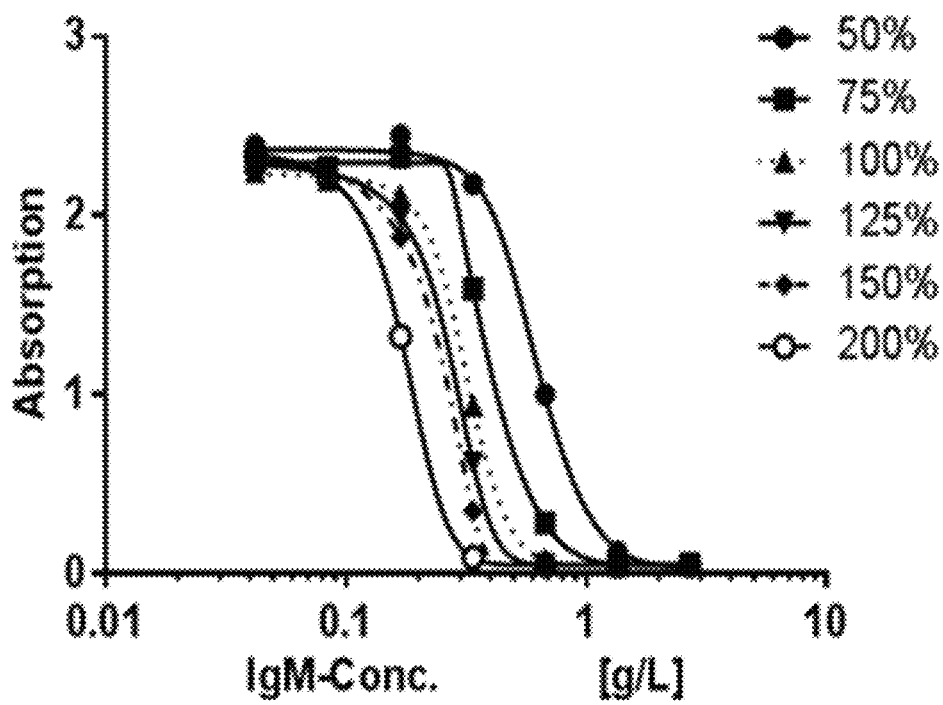

FIG. 2 shows the validity of the assay of the invention for characterisation and quality control, in particular, for testing potency. Using the general method and materials set out in Example 1, samples having a concentration of 50%, 75%, 100%, 125%, 150% and 200% of the standard were tested for potency. A shows a photograph of the assay plate, wherein a higher concentration of the immunoglobulin composition in the upper part of the plate leads to maintenance of the erythrocytes in the wells, while a lower concentration allows for lysis of the erythrocytes. B shows the results of the absorption measurement.

Figure 3:
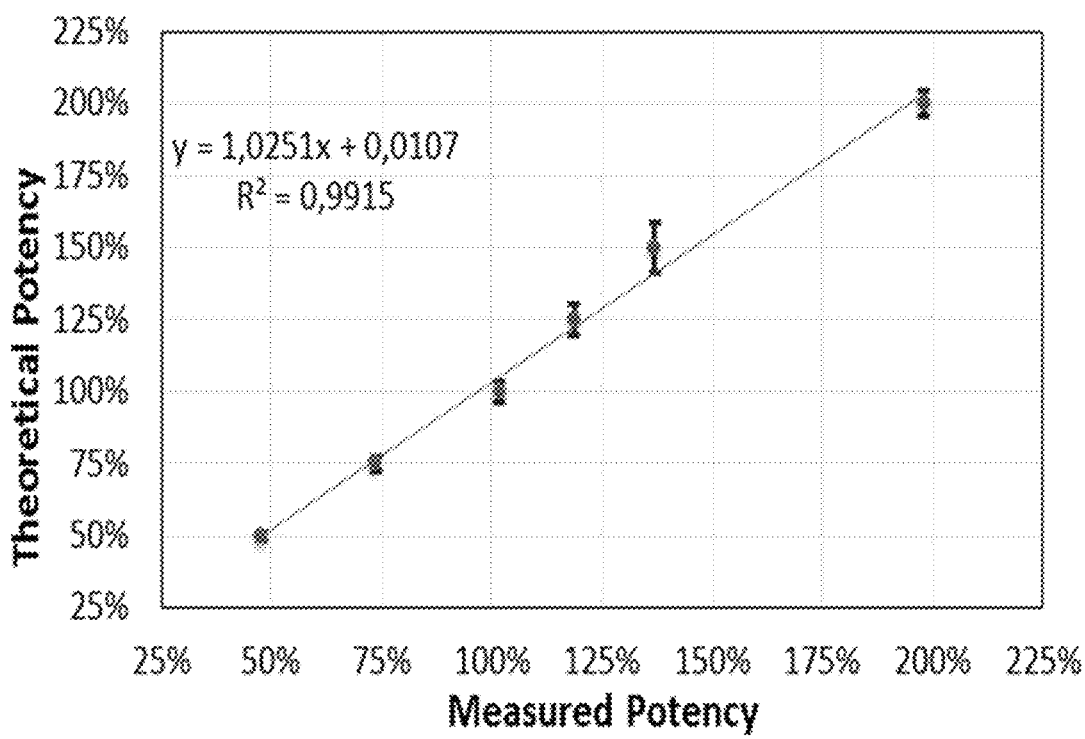

FIG. 3 compares the measured and theoretical potency of IgM composition (Example 3) samples diluted to 50%, 75%, 200%, 125%, 150% and 200% theoretical potency. Based on the general conditions set out in Example 1, the potency assay was carried out in three separate runs.

Figure 4A:
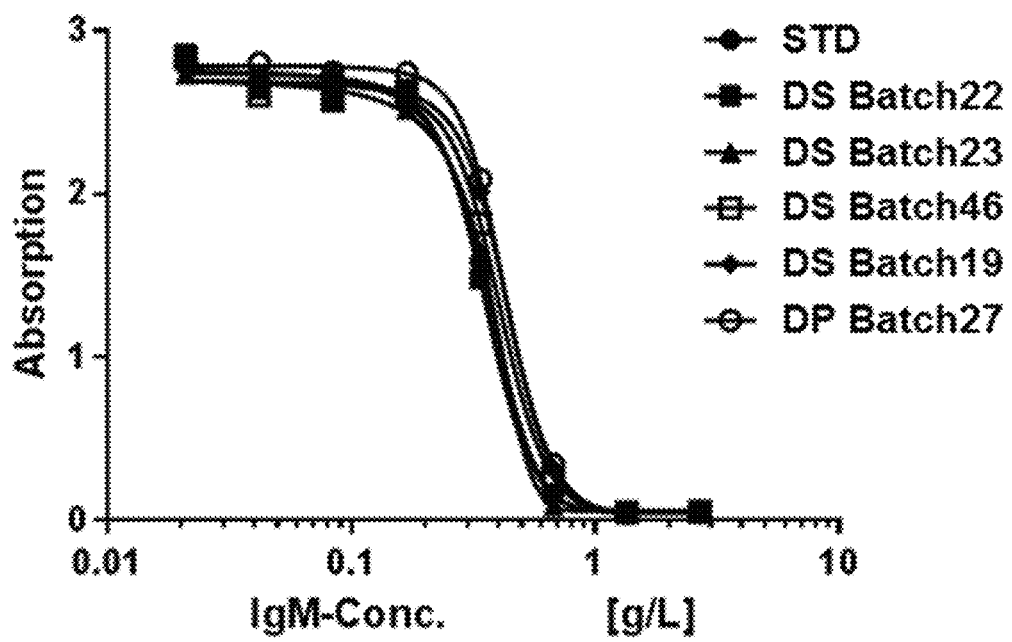
Figure 4B:
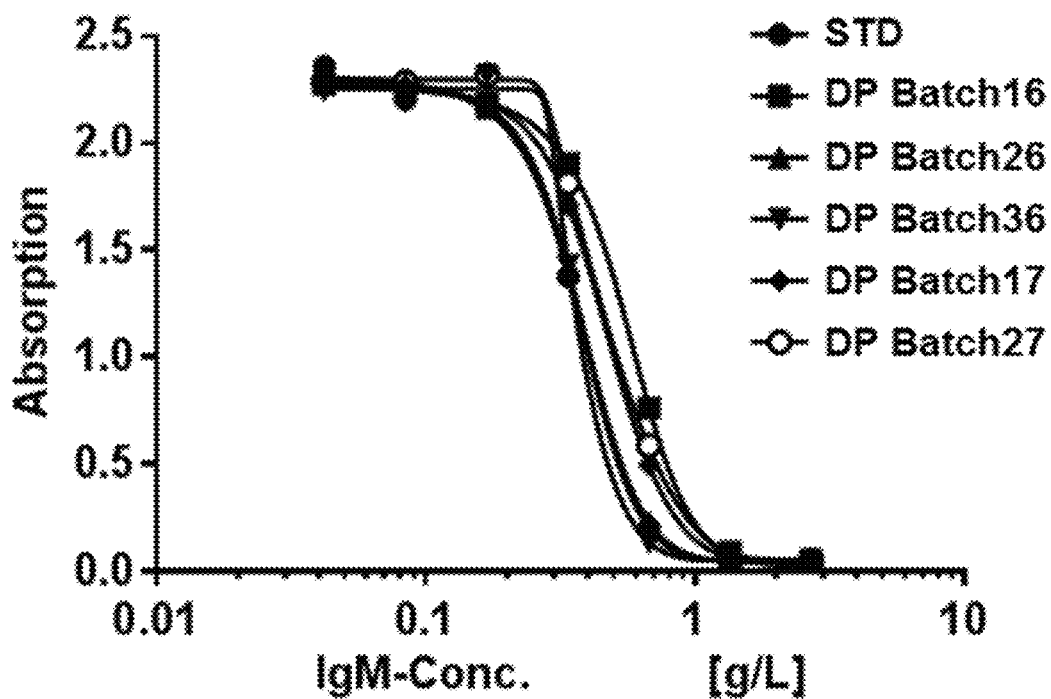

FIG. 4 compares the potency of different (A) DS (drug substance) and (B) DP (drug product) batches of an IgM comprising immunoglobulin composition. The assay was carried out using the general conditions set out in example 1.

FIG. 5 provides the results of Example 2c and shows decreased potency upon storage at high temperatures and under the influence of chemical stressors (A) as well as UV-C irradiation (B).

Figure 6:
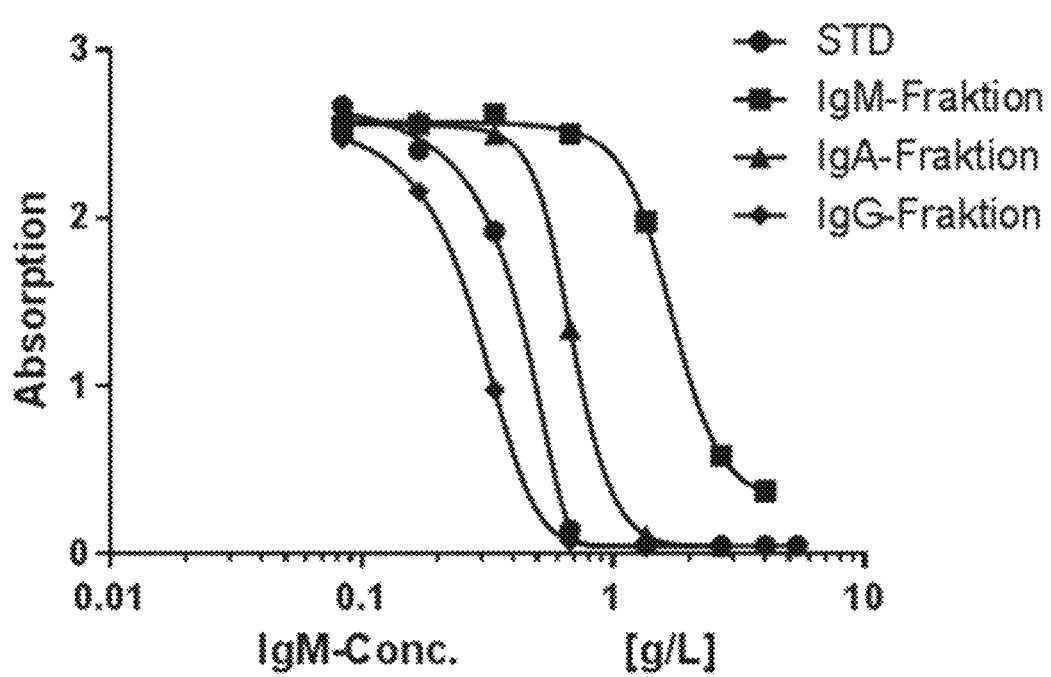

FIG. 6 compares absorption results, detected according to the general method of Example 1, for fractions enriched for IgM, IgG and IgA and the standard IgM containing compositions comprising about 23% IgM, 56% IgG and 21% IgA. Details are described in Example 2d.

DETAILED DESCRIPTION OF THE INVENTION

The present invention provides a method for characterisation and quality control of an immunoglobulin composition comprising immunoglobulins derived from a plurality of human donors, the method comprising
a) contacting the immunoglobulin composition with pneumolysin,
b) mixing erythrocytes with the immunoglobulin composition of step a), e.g., adding erythrocytes to the immunoglobulin composition of step a), i.e., the composition contacted with pneumolysin, to obtain a mixture,
c) determining lysis of the erythrocytes.

The invention also provides a method for characterisation and/or quality control of an immunoglobulin composition comprising immunoglobulins derived from a plurality of human donors, the method comprising
a) contacting the immunoglobulin composition with pneumolysin,
b) mixing erythrocytes with the immunoglobulin composition of step a), e.g., adding erythrocytes to the immunoglobulin composition of step a) to obtain a mixture,
c) determining lysis of the erythrocytes,
d) thereby determining the potency of said immunoglobulin composition.

The methods of the invention may advantageously be used for quality control, i.e., for testing if an immunoglobulin composition derived from a plurality of human donors complies with specific standards, e.g., if it has a desired potency or activity.

The methods of the invention may also be used for characterisation, in particular, when it is of interest to determine the properties of an immunoglobulin composition, e.g., for providing a product profile of a product not yet characterised. For example, potency can be determined.

The immunoglobulin composition preferably comprises at least 30 g/L immunoglobulins, i.e., a higher concentration than blood, serum or plasma from healthy human donors. It can, therefore, also be designated an immunoglobulin concentrate. The immunoglobulin composition preferably comprises at least 40 g/L immunoglobulins, e.g., 45-100 g/L immunoglobulins or about 49-50 g/L. It does not contain any cells, and has typically been purified to contain, essentially, the immunoglobulins and a buffer suitable for administration to a human subject. Preferably, it does not comprise substantial amounts of complement factors or any complement factors. Typically, it is a solution. The immunoglobulins may be e.g., at least 95% or at least 98% or at least 99% of the total protein (w/w).

Preferably, the immunoglobulins in the immunoglobulin composition are of human origin, more particularly it is a polyclonal immunoglobulin composition of human origin.

The immunoglobulin composition of interest in the present invention is derived from a plurality of donors. A composition derived from a plurality of donors has the advantage that it contains a mixture of antibodies developed against pathogens to which a broad population of donors has been exposed and that it will be less dependent on individual exposure to antigens by single donors. E.g. many but not all donors may have been in contact with *Streptococcus pneumoniae*. A large population of donors will decrease the variation between different batches. However, advantageously the present invention may also serve to control for variations due to different pneumolysin exposure of the donors. Thus, in the context of the present invention, a plurality of donors preferably means from 2 donors-10 000 donors, preferably 20-10 000 donors, more preferably 100-10 000 donors or more preferably 500-8000, or more preferably 500 to 5000 donors. One donor can provide more than one donations. For example, the immunoglobulin composition of interest in the present invention can derived from at least 500 donations or, preferably, at least 1000 donations. Typically, it is derived from about 3 000 donations.

The immunoglobulin composition may be derived from human blood, plasma or serum. Typically, the immunoglobulins are derived from human plasma.

Typically, it is unknown for at least one of said plurality of donors whether said donor has had previous contact with a specific pathogen, such as *S. pneumoniae* or an antigen thereof, e.g., pneumolysin. Generally, the immunisation status of all donors against different pathogens is unknown. Often, at least one of said plurality of donors has not had previous contact with *S. pneumoniae* or pneumolysin.

If the immunoglobulin composition is for use in treatment or prevention of a specific infectious disease, the donors may be, however, insofar selected as they are chosen from a geographic region with a certain prevalence of said infectious disease. Alternatively, the may be chosen from a group of donors who have been vaccinated with a certain antigen or against a specific disease. They may also be chosen from donors who have been selected based on high titers for a certain antigen. In any case, the composition typically comprises immunoglobulins directed to a multitude of antigens.

Due to the large number of donors, there is a large likelihood that a significant number of donors has had previous contact with a specific pathogen causing a disease, such as *S. pneumoniae*, and that the serum of said donors thus comprises antibodies against *S. pneumoniae* and antigens thereof, e.g., pneumolysin (PLY). Accordingly, the immunoglobulin composition preferably comprises antibodies to pneumolysin.

Due to the large size of the donor population, the statistical prevalence of different pathogens determines the ratio of prevalence of antibodies to said pathogens in the immunoglobulin composition. The immunoglobulin composition thus typically comprises, e.g., antibodies directed to *S. pneumoniae* in a relatively constant ratio to antibodies directed to other pathogens, e.g., *Haemophilus* influenza.

In the preparation of an immunoglobulin composition, characterisation and/or quality control is important to ensure consistent quality of the product. This is a need despite rigorous control of manufacturing. For example, in the unlikely event that preparations have become degraded or dysfunctional, this must be recognized. Therefore, measures of quality control, including control for biological activity of immunoglobulins, are typically routinely carried out for commercial preparations of immunoglobulin. Quality control is typically performed at the end of the production process, but can also be performed on intermediates during production. By means of the assay of the invention, it can be determined if the immunoglobulins are biologically active.

One aspect of characterisation and quality control is determination of potency or effectiveness, which is a measure of drug activity expressed in terms of the amount required to produce an effect of given intensity. A highly potent drug evokes a given response at low concentrations, while a drug of lower potency evokes the same response only at higher concentrations. The potency depends on both the affinity and efficacy of the active agent. Affinity is how well a drug can bind to a target. Efficacy is the relationship between target occupancy and the ability to initiate a response. In the context of the present invention, e.g., for an immunoglobulin composition intended for use in treatment of a disease such as pneumonia, which may be caused by *S. pneumoniae*, potency is a measure of the amount required to produce an effect of a given intensity against *S. pneumoniae* or more particularly to its toxin pneumolysin. Due to the relatively constant ratio of antibodies directed to different pathogens in an immunoglobulin composition derived from a large donor population, the potency against one pathogen or toxin can also be taken as an indication of potency against another pathogen or toxin. Even though determination of the potency in therapy of *S. pneumoniae* infection, and accordingly, pneumonia caused by this pathogen will be particularly accurate, the method of the invention is not limited to determination of the potency against pneumonia caused by *S. pneumoniae*, but can further be used as a measure of general potency against pneumonia and other diseases caused by other infections agents. This in particular applies for infectious agents to which at least a significant part of the donor population has been exposed or antigens against which at least a significant part of the donor population has been vaccinated. Moreover, the potency as measured according to the present invention can also be taken as an indicator of the general functional integrity of the immunoglobulin composition. E.g. if immunoglobulins in the composition have been denatured or partially denatured, then not only the capability of neutralizing pneumolysin is affected, but also the capability to bind other antigens. However, in a narrow sense, the term potency according to the present invention means the ability of the immunoglobulin composition to inhibit or neutralize the lysing effect of pneumolysin on human cells, in particular erythrocytes, as further elaborated elsewhere in this specification.

The invention also provides use of pneumolysin for characterisation and/or quality control, e.g., for determining the potency of an immunoglobulin composition comprising at least 30 g/L immunoglobulins derived from a plurality of human donors. The potency can be determined by the method of the invention. The degree of lysis of the erythrocytes is inversely correlated to the quality or the potency of the immunoglobulin composition.

The immunoglobulin composition comprises human immunoglobulins. Throughout the invention, the immunoglobulin composition may comprise IgG, IgM and/or IgA, preferably, all three classes. The percentage of IgM may be about 0-100% or 5-50%, e.g., 18-28%, preferably, 22-23%. Preferably, the immunoglobulin is enriched in IgM, and comprises at least about 5% % IgM, more preferably, at least about 10% IgM, more preferably at least about 18% IgM. It can thus also be designated IgM concentrate or IgM-containing immunoglobulin composition. Throughout the application, antibody percentages are provided as weight/total immunoglobulin weight, i.e., antibody percentages of different classes IgG, IgA and IgM add up to 100%. Amounts of immunoglobulins indicated herein may be easily determined according to methods known in the art, for example using nephelometry in accordance with the European Pharmacopoeia 8.0, 2.7.1 (Siemens BN Prospec® System). The antibody (or immunoglobulin) composition may or may not comprise IgD and IgE, typically it does not comprise IgD and/or IgE in an amount exceeding 1% by weight.

Independently, the percentage of IgA may be about 0-100% or 5-50%, e.g., 16-26%, preferably, 20-21%. Independently, the percentage of IgG may be about 0-100% or 30-80%, e.g., 51-61% or 55-56%.

A preferred immunoglobulin composition to be used in the context of the present invention comprises human immunoglobulin of the IgG, IgM and IgA classes in concentrations of 18-28% IgM, 16-26% IgA and 51-61% IgG, e.g., 23% IgM, 21% IgA, and 56% IgG, (Biotest AG).

Other suitable immunoglobulin compositions include Pentaglobin (Biotest AG) containing 72% IgG and is enriched in IgM (12%) and IgA (16%), which has been treated with beta-propiolactone, and IgAbulin, Immuno AG, Vienna), which mainly comprises IgA and IgG.

Typically, the immunoglobulin composition shall be suitable for pharmaceutical use, more preferably approved for pharmaceutical use. Typically, the immunoglobulin composition is purified, e.g. it contains at least 95% immunoglobulins by weight of total protein, more typically at least 98%. Also typically, the immunoglobulin composition is virus-safe, e.g. the manufacturing should comprise at least two effective steps (more than 3 log 10 reduction, preferably more than 4 log 10 reduction) for inactivation of enveloped viruses and at least one effective step for inactivation of non-enveloped viruses. Such steps are known to the skilled person. For example, such steps may be selected from the group comprising precipitation (in particular ethanol precipitation), nanofiltration, pasteurization, octanoic acid precipitation, UV-treatment, low pH treatment, solvent-detergent treatment, and chromatography.

In one embodiment, the composition is chemically modified. In another embodiment, the immunoglobulin composition is not intentionally chemically modified. This means that it has not been treated with agents intended to lead to chemical modifications. Certain modifications may, however, occur during the preparation. Thus, the composition substantially does not comprise chemically modified immunoglobulin. Methods of preparation of immunoglobulin composition are disclosed in WO 2011/131786 A2 and WO 2011/131787 A2.

The composition may be chemically modified, e.g., with beta-propiolactone. In another embodiment, the immunoglobulin composition substantially does not comprise immunoglobulin modified with beta-propiolactone.

For characterisation and quality control, e.g., for determination of the potency, the immunoglobulin composition may be serially diluted or titrated, preferably, in the range of 0.02 g/L to 2.7 g/L. It is noted that this concentration, as other concentrations cited herein, if not specifically disclosed otherwise, relates to the mixture of step b. Before addition of erythrocytes, in step a), a preferred concentration range for the immunoglobulin composition is 0.03-0.405 g/L. If the concentration in step a) before addition of erythrocytes is lower than 30 g/L, the method comprises a further step of dilution of the immunoglobulin composition before step a). Alternatively, the method can also be adapted to work with a more highly concentrated immunoglobulin composition.

In step a, the immunoglobulin composition is contacted with pneumolysin. The assay has been found to be highly reproducible when the pneumolysin is *Streptococcus pneumoniae* serotype 4 pneumolysin, wherein, preferably, the pneumolysin is recombinant full length pneumolysin expressed in E. coll.

Alternatively, the pneumolysin may be *Streptococcus pneumoniae* serotype 2 pneumolysin, wherein, preferably, the pneumolysin is recombinant full length pneumolysin expressed in *E. coli*.

The pneumolysin may also be a shortened or mutated version capable of erythrocyte lysis, but full length pneumolysin is preferred to ensure full functionality in erythrocyte lysis and to avoid artefacts. Expression may also be in other bacteria or in plant, animal or human cells. Preferably, the glycosylation is similar or preferably the same as the glycosylation of pneumolysin generated by infection in human lung cells. Fusion proteins may be used, e.g., with C-terminal and/or N-terminal tags, e.g., a His-tag, or as described in Example 1.

Particularly good results have been found when the concentration of pneumolysin was 0.06 to 5 µg/ml. If the pneumolysin is serotype 2 pneumolysin, the concentration preferably is 0.25-10 µg/mL, most preferably, 2-5 µg/mL. If the pneumolysin is serotype 4 pneumolysin, the concentration preferably is 0.01-0.67 µg/mL or 0.02 µg-0.3 g/mL, preferably, 0.03-0.04 µg/mL. Again said concentrations are obtained in the mixture of step b. In step a, a preferred concentration of pneumolysin type 4 added is 0.05 µg/mL.

It is noted that the preferred concentrations disclosed herein are adapted to have optimal results if used in combination with each other. Of course, the skilled person will be able to modify said concentrations and adapt them, e.g., if one of the components is present in a different concentration or has a different biological activity.

Contacting the immunoglobulin composition with pneumolysin, i.e., step a) may be carried out until equilibrium intermolecular interaction is substantially or completely reached. The incubation time and temperature may be chosen as deemed appropriate by the skilled person. For example, step a) may be carried out at 2-40° C., more preferably at 5-40° C., more preferably 18-39° C., e.g. at room temperature (18-25° C.) or at physiological temperature (35 to 39° C.), for 15 min to 24 h, preferably, for 20-60 min, e.g., 25-35 min. Preferably, the contacting comprises mixing the immunoglobulin composition and pneumolysin In step b), erythrocytes and immunoglobulin composition of step a) are mixed to obtain a mixture, e.g., erythrocytes are added to the immunoglobulin composition of step a) (i.e. the immunoglobulin composition contacted with pneumolysin) to obtain a mixture. Alternatively, the immunoglobulin composition may be added to erythrocytes. The erythrocytes may be, e.g., human erythrocytes, sheep red blood cells, or rabbit red blood cells, preferably, human erythrocytes. For example, they may be human erythrocytes of the blood group 0rr to ensure that none of the blood group antibodies in the immunoglobulin react with the erythrocytes. If erythrocytes are recognized by antibodies from the composition, e.g., if they are from another blood group, this may decrease reproducibility of the assay. It is understood that preferably the erythrocytes are added in a manner such that a predefined concentration in the mixture of step b) is reached. The concentration preferably is 1-4.5% (v/v) erythrocytes (in the mixture of step b), e.g., 3-4.5% human erythrocytes or 1.6-3% (v/v) sheep erythrocytes.

The erythrocytes can be in any form deemed appropriate, e.g. as whole blood or in purified form. However, it is preferred that the erythrocytes are purified. In particular, other cell types should be substantially removed to avoid undesired interactions. It has been found that using purified erythrocytes, it is possible to improve the standardization of the test and to reduce undesired detrimental factors.

The mixture of step b) is incubated for a period of time deemed appropriate by the skilled person, e.g., the mixture of step b) is incubated until the erythrocytes have been lysed by the pneumolysin that has not been neutralised by antibodies in the immunoglobulin composition. Typically, the mixture of step b) is incubated for a predefined period of time. The assay has been found to be highly reproducible if the mixture of step b) is incubated at, e.g., at 37° C. for 5 min to 48 h, e.g., 15 min to 24 h or 30-180 min, preferably, for 40-120 or 60-70 min.

In step c), lysis of the erythrocytes is determined. Preferably, throughout the invention, the lysis of the erythrocytes is determined by detecting the concentration of haemoglobin in a supernatant, e.g., centrifugation supernatant, of the mixture of b) at 370-590 nm, wherein the concentration is preferably detected at 390-450 nm, e.g., about 405 nm. Centrifugation can be performed in a multi-well plate, e.g., at 2232 g (3200 rpm) for 5 min. This leads to an assay that is very easy to carry out, as it directly uses the function of pneumolysin in erythrocyte lysis as a readout system.

Alternatively, the lysis of the erythrocytes may be determined by a cyanmethaemoglobin-based method.

Similar assays have previously been performed to assess the activity of pneumolysin or mutants thereof (e.g., Shak et al., 2013. mBio 4(5):e00655-13; Lawrence et al., 2015. Nature Scientific Reports 5:14352; Li et al., 2017. Nature Scientific Reports 4:42015; van Pee et al., 2017. eLife 6:e23644; Korchev et al., 1998. Biochem. J. 329:571-577).

A high lysis (i.e., a high concentration of haemoglobin in the supernatant) corresponds to low potency of immunoglobulin composition, i.e., low neutralisation of pneumolysin, and vice versa.

The potency of the immunoglobulin composition(s) being tested, i.e., of the sample(s) may be compared to the potency of a reference standard composition. Such reference standard may be e.g., a sample of a public reference standard such as available for certain immuno-globublin preparations e.g. from CBER (Center for Biologics Evaluation and Research, USA) or EDQM (European Directorate for the Quality of Medicines and Healthcare, Council of Europe, Strasbourg, France). Alternatively, the reference standard may be an internal reference standard. E.g. it could be a internal standard of an IgM-containing immunoglobulin composition. The ratio of the potency of the immunoglobulin composition to the potency of the standard immunoglobulin composition is the relative potency. Potency of the standard, e.g. an IgM-containing composition reference standard, is set to 100%.

Preferably, steps a) to b) are carried out with different concentrations of the immunoglobulin composition, e.g. at least 2, 3, 4, or 5 different dilutions. Preferably, at least 3 different concentrations are employed, more preferably 4 or 5. The skilled person will be able to determine suitable concentrations. The different concentrations are typically prepared by dilution, e.g., 1:1 dilutions, 1:2 dilutions or 1:3 dilutions.

To reduce variation of measurement, each concentration may be tested in multiple (e.g. 2, 3 or 4) samples.

Preferably, the concentration of pneumolysin is constant when different concentrations of the immunoglobulin composition are tested.

A dose response curve may be determined based on the samples with different concentrations of the immunoglobulin composition. The analysis of potency may then carried out based on a shift of the dose-response curve, e.g., using parallel line assessment.

If each concentration is tested in multiple samples, an average value may be calculated and used as a basis for the dose-response curve. A mean value or weighted average may be determined from the parallel samples. Alternatively, curve-fitting can be carried out with all single values.

Testing of multiple samples, typically, in parallel, allows to reduce variability of test results based on variation between single samples, e.g. due to variation in pipetting.

Advantageously, the method can be carried out in a suitable array format, such as in a multi-well plate, e.g. a 96-well plate.

Potency is calculated, preferably, by comparing dose-response curves of the immunoglobulin composition to be tested with the dose-response curve of a suitable reference standard. For example, parallel line assessment and a 4 or 5 Parameter logistic fit can be used (e.g. using Software PLA 3.0, Stegmann Systems GmbH).

As control, lysis of erythrocytes can be performed with an agent leading to lysis of all erythrocytes present, e.g., a detergent in a suitable concentration, such as Triton-X-100 (e.g., 1.5%) or saponin or deionized water. This agent is added e.g. instead the immunoglobulin composition contacted with pneumolysin. This control can serve to determine the value for maximum possible lysis.

As another control, a physiologic buffer (e.g., D-PBS or PBS or media) may be tested instead of pneumolysin, preferably the same buffer used for testing in steps a) and b) of the method according to the invention. Such control may be taken to determine the value for baseline lysis in absence of pneumolysin.

The invention thus provides a method for characterisation and quality control of an immunoglobulin composition comprising immunoglobulins derived from a plurality of human donors, comprising testing potency of the immunoglobulin composition by the method of the invention, as described herein.

The method for characterisation and quality control, or the potency assay of the invention can be performed on the drug substance, typically, a solution more highly concentrated that the desired final drug product, i.e., the immunoglobulin composition to be tested can be the drug substance. The drug substance is a bulk concentrate or bulk intermediate comprising the active pharmaceutical ingredient, and it is not yet packaged in single units, but used to formulate the drug product, i.e, the dosage form or finished product which comprises the drug substance, usually further comprising excipients. The method of the invention can also be carried out on the drug product, which may optionally already be packaged in a primary packaging. Alternatively or additionally, intermediates in the production process, in process samples, development samples and stability samples can be tested by the method of the invention, which allows for an early selection of production batches or parts thereof, e.g., pooled compositions leading to a desired potency of the drug product, e.g., a potency of 50-200% relative to a standard immunoglobulin composition such as a standard IgM-containing composition.

The desired potency of the drug product may be, e.g., a potency of 50-200% or 70-150% or 80-120% relative to a standard immunoglobulin composition such as a standard IgM composition (Example 3). Preferably, the desired potency is obtained at a defined concentration of the immunoglobulin composition, e.g., 50-70 g/L or 40-60 g/L.

The invention also provides a method for preparing a standardized immunoglobulin composition comprising at least 30 g/L immunoglobulins derived from a plurality of human donors, comprising
i. pooling plasma or serum derived from a plurality of human donors to provide a pool;
ii. isolating and concentrating immunoglobulins from the pool to produce an immunoglobulin composition;
iii. characterising or testing quality of the immunoglobulin composition of ii) by the method of the invention, wherein said immunoglobulin composition is optionally discarded if the relative potency of said immunoglobulin composition is not in a predetermined range, e.g., of 50-200%, of the potency of the standard immunoglobulin composition; and
iv. optionally, adapting the potency of the immunoglobulin composition to a desired potency (e.g., 50-200% of the potency of the standard immunoglobulin composition); and/or
v. optionally, packaging an amount of the immunoglobulin composition, e.g., an amount having a desired potency.

The predetermined range may also be, e.g., 80-120% of the potency of the standard immunoglobulin composition.

Adapting the potency may e.g., be carried out if the relative potency of said immunoglobulin composition is in the predetermined range, e.g., of 50-200%, of the potency of the standard immunoglobulin composition. In that case, it may still be of interest to prepare a product for which the batches all have essentially the same potency, e.g., 80-120%, 90-110% or about 100% of the potency of the standard immunoglobulin composition.

Preferably, no adaptation of the potency is required.

Packaging at least comprises packaging in a secondary packing (e.g., cardboard boxes) and adding instructions for use. Packaging of the final step consists of these steps if the testing of step iii. is performed on one or more samples from the drug product which is already filled into a primary packaging. Multi-unit packaging may still be added. Optionally, packaging further comprises packaging in a primary packaging, e.g., in vials, bottles, syringes, plastic backs for infusion etc., in particular, if the testing of step iii is performed on the drug substance. Testing can also be performed on drug substance which has already been diluted to the final concentration, but not yet packaged.

The immunoglobulin containing composition can be stored, e.g., at 80 to 8° C., preferably, at −2 to 8° C. or at about 5° C. at any time in the preparation process. For example, often, plasma or serum are stored before or after pooling in order to perform tests on the donors or the donations, e.g., to prevent contaminations with pathogens. Of course, the final product can also be stored, as described.

In another aspect, the invention also provides a kit for carrying out the method of the invention, comprising
pneumolysin, e.g., full length pneumolysin, which may be recombinantly produced e.g., in *E. coli*,
a standard immunoglobulin composition, preferably, IgM-containing composition (e.g.
manufactured according to Example 3),
a detergent selected from the group comprising Triton X-100 and saponin, and
a buffer in which erythrocytes are not lysed, selected from the group comprising PBS and D-PBS,
wherein the kit optionally further comprises erythrocytes, e.g., human erythrocytes.

The invention also provides a composition comprising a standard immunoglobulin composition, preferably, an IgM-containing immunoglobulin composition, and pneumolysin, wherein the composition optionally further comprises erythrocytes. The composition may also comprise lysed erythrocytes.

The invention further provides an immunoglobulin composition comprising immunoglobulins derived from a plurality of human donors standardized to a desired potency, preferably, a relative potency of 50-200% or 80-120%, by the method of determining the potency of an immunoglobulin composition described herein, wherein the immunoglobulin composition preferably is obtainable from the method for preparing a standardized immunoglobulin composition described herein. Preferably, a plurality of such standardized immunoglobulin composition, in particular, a plurality of charges or batches of such standardized immunoglobulin composition are provided, which comprise immunoglobulins derived from a plurality of donors as described herein, wherein all charges or batches have a potency in the same range determined by the method of the invention.

The immunoglobulin composition is useful in the treatment or prevention of bacterial respiratory tract infections such as pneumonia, e.g., treatment of an infection with *S. pneumoniae*, preferably, in the treatment or prevention of severe community acquired pneumonia. Treatment is preferred. The immunoglobulin composition may also be used for treatment or prevention of other diseases, e.g., as described above. It may be particularly useful for treatment and prevention of bacterial respiratory tract infections in patients having a reduced amount of immunoglobulins, in particular, if the immunoglobulin composition comprises IgM in a concentration of more than 12%, preferably, more than 18% and/or IgA in concentrations of more than 10%, preferably, more than 16% (e.g., trimodulin), in patients with IgM and/or IgA deficiencies.

The following examples are intended to illustrate the scope of the invention, and do no limit the same. All references cited herein are fully incorporated herein by reference.

EXAMPLES

Example 1: Pneumolysin Neutralisation Assay

The Pneumolysin Neutralisation Assay is used to characterise and control quality, in particular, to determine the potency of an immunoglobulin composition such as an IgM containing composition (e.g. produced by Biotest AG, Dreieich, Germany). The assay uses the property of pneumolysin (PLY) to lyse human erythrocytes. The erythrocytes release free haemoglobin upon lysis which can be detected photometrically. Human erythrocytes are preincubated with one concentration of pneumolysin in presence or absence of different concentrations of an IgM-containing immunoglobulin composition. The immunoglobulins from said composition inhibit pneumolysin mediated effects on erythrocytes and, thereby, inhibit lysis of erythrocytes in a dose-dependent manner. The potency of an unknown sample is determined by comparison with a reference standard.

1. Material

The material can, e.g., be derived from the sources detailed below. Other material may be used.

TABLE 1

| Material | Supplier | Purchase number |
|---|---|---|
| Human erythroctyes (blood group 0rr) | Bio-Rad Laboratories, Germany, Inc., USA | N/A |
| Alseverse solution | Bio-Rad Laboratories, Germany, Inc., USA | 806505 |
| Dulbecos Buffered Saline (D-PBS) | Gibco Lifes Technologies, Thermo Fisher Scientific, USA | 14190-094 |
| Triton-X-100 | Merck, Darmstadt, Germany | 1.08603.1000 |
| Recombinant *Streptococcus pneumoniae* serotype 4 Pneumolysin (ply), Full Length, N-terminal 6xHis-SUMOtagged, *E. coli* | BIOZOL Diagnostica Vertrieb GmbH, Eching Germany | CSB-EP314690FMW |
| IgM composition (Example 3) | Biotest AG, Dreieich, Germany | N/A |
| transparent 96 well U-bottom plate | Greiner Bio-One, Cellstar, Germany | 650180 |
| transparent 96 well F-bottom plate | Greiner, Bio-One, Cellstar, Germany | 655180 |

2. Method

Prepare a 4.5% erythrocyte solution (v/v) in Alseverse solution (Bio-Rad Laboratories, Germany, Inc., USA) by using sodium chloride anticoagulated human blood 0rr (Bio-Rad Laboratories, Germany, Inc., USA): wash human 4.5% erythrocyte solution (v/v) in Alseverse solution two times with Dulbecos Buffered Saline (D-BPS, Thermo Fisher Scientific, Waltham, USA) by means of centrifugation at 1800×g for five minutes. The supernatant is discarded.

Preparation of Pneumolysin (PLY) solutions: prepare a 400 µg/mL recombinant *Streptococcus pneumoniae* serotype 4 Pneumolysin (BIOZOL Diagnostica Vertrieb GmbH, Eching, Germany) stock solution in D-BPS. Dilute stock solution to a final concentration of 0.1 µg/mL PLY (corresponds to 0.03 µg/mL in plate).

50 µL of each PLY concentration is needed for each well.

Preparation of standard (STD) IgM composition (Example 3) solution: dilute composition (Example 3) reference standard (49 g/L) in a ratio of 1:6 (v/v) in D-BPS, in order to get a starting concentration of about 8.2 g/L.

Preparation of IgM composition (Example 3) samples: dilute IgM composition (Example 3) samples to a concentration of about 8.2 g/L.

Preparation of negative control: as negative control, D-BPS is used (50/well).

Preparation of positive control: prepare a 1.5% solution of Triton-X-100 (Merck, Darmstadt, Germany) (v/v) in D-BPS (50/well).

Use a transparent 96 well U-bottom plate (Greiner Bio-One, Cellstar, Germany) to set up the assay (plate 1). For example, pipette 50 µL of D-PBS in wells B1-B10, C1-010, D1-D10, E1-E10, F1-F10, G1-G10, H1-H10.

Pipette 100 µL of 1:6 diluted IgM composition (Example 3) drug product (8.2 g/L), for example in wells A1-A2 (standard).

Pipette 100 µL of IgM composition (Example 3) internal SST (System Suitability Test) control (6.6 g/L), for example in wells A3-A4 (standard).

Pipette 100 µL of IgM composition (Example 3) samples (8.2 g/L), for example in A5-A6, respectively, A7-A8, A9-A10 to get a determination in duplicates.

Pipette 50 µL DPBS and 50 µL Positive Control, e.g., in wells A11-H11. Pipette 50 µL DPBS and 50 µL Negative Control, e.g., in A12-H12.

All samples, standard and internal control are further titrated in 1:2 dilution steps by means of a multichannel pipette. For example, pipette 50 µL of each well of row A to row B and mix for 20 times. Change pipette tips. Pipette 50 µL of each well of row B to row C and mix for 20 times. Proceed until row H. Discard 50 µL of row H.

a) Pipette 50 µL of 0.1 µg/mL PLY into all wells.

Incubate plate at 37° C., at 5% $CO_2$ for 30 minutes in an incubator.

b) After the 30 minutes of incubation in step a), add 50 µL of 4.5% erythrocyte solution (v/v) in D-BPS to each well.

The concentration of PLY in the wells is now 0.03 µg/mL, and the concentration of erythrocytes is 1.5% (v/v). The sample and standard concentration is in the range of 0.02 g/L to 2.7 g/L (except for the internal control sample, which is 80% thereof).

Incubate plate at 37° C., at 5% $CO_2$ for 60 minutes.

c) Centrifuge plate at 2000×g for five minutes (3200 rpm). Take a picture of the plate for documentation.

Transfer 60 µL of supernatant of each well with a multichannel pipette in a transparent 96 well F-bottom plate (Greiner Bio-One, Cellstar, Germany). Read absorbance at 405 nm±1 nm to detect free hemoglobin using a photometer.

Evaluation

Samples are compared to an internal IgM composition (Example 3) reference standard and potency is calculated using parallel line assessment and a 5 Parameter Logistic fit (Software PLA 3.0). Therefore, potency of IgM composition (Example 3) reference standard is set to 100%. Potency of internal control and samples are compared to potency of IgM composition (Example 3) reference standard and value is calculated.

Example 2: Validation of the Pneumolysin Assay a) Recovery, Precision and Linearity of the Pneumolysin Assay IgM composition samples (Example 3) were adjusted to 50%, 75%, 100%, 125%, 150% and 200% theoretical potency. Based on the general conditions set out in example 1, the potency assay was carried out in three separate runs. Mean potency, recovery and the coefficient are shown in the table below. The measured and theoretical potency are compared in FIG. 3.

TABLE 2

| Theoretical Potency Sample | Result Potency Run 1 | Result Potency Run 2 | Result Potency Run 3 | Mean Potency Run 1-3 | Mean Recovery | Coefficient of variation |
|---|---|---|---|---|---|---|
| 50% | 49.6% | 47.3% | 46.3% | 47.7% | 95.4% | 1.5% |
| 75% | 71.4% | 72.1% | 76.5% | 73.3% | 97.8% | 2.3% |
| 100% | 100.2% | 98.5% | 106.3% | 101.6% | 101.6% | 3.3% |
| 125% | 118.2% | 112.2% | 124.1% | 118.2% | 94.5% | 5.1% |
| 150% | 137.4% | 125.8% | 144.0% | 135.8% | 90.5% | 8.3% |
| 200% | 201.8% | 191.5% | 200.8% | 198.0% | 99.0% | 4.7% | b) Comparison of Different Batches

IgM composition (Example 3) samples from different DS and DP batches were tested based on the general conditions set out in example 1. The results are provided in FIG. 4, and the potencies compared in the table below.

TABLE 3

| Batch | DS/DP | Result Potency Run 1 | Result Potency Run 2 | Result Potency Run 3 | Mean Potency Run 1-3 | Coefficient of variation |
|---|---|---|---|---|---|---|
| Batch74 | DS | 65.9% | 79.8% | 59.1% | 68.3% | 12.6% |
| Batch22 | DS | 91.1% | 102.8% | 77.2% | 90.4% | 11.6% |
| Batch23 | DS | 90.9% | 97.7% | 72.3% | 87.0% | 12.3% |
| Batch45 | DS | 74.9% | 71.5% | 74.8% | 73.7% | 2.1% |
| Batch44 | DS | 73.0% | 72.1% | 71.2% | 72.1% | 1.0% |
| Batch18 | DS | 77.2% | 81.0% | 75.0% | 77.7% | 3.2% |
| Batch20 | DS | 86.9% | 79.1% | 85.9% | 84.0% | 4.1% |
| Batch16 | DP | 63.8% | 73.3% | 64.7% | 67.3% | 6.4% |
| Batch26 | DP | 83.8% | 104.6% | 86.0% | 91.5% | 10.2% |
| Batch36 | DP | 82.6% | 99.4% | 89.0% | 90.3% | 7.7% |
| Batch17 | DP | 72.0% | 89.3% | 78.7% | 80.0% | 8.9% |
| Batch27 | DP | 78.0% | 98.7% | 82.9% | 86.5% | 10.2% | c) Comparison of Samples Affected by Different Stressors

IgM composition (Example 3) samples from batch Batch16 or Batch36 were treated differently and compared to a freshly prepared standard in a potency assay carried out using the general conditions laid out in Example 1:
- storage at 28-32° C.
- treatment with 3% $H_2O_2$ for four days at room temperature
- treatment with 3.3% $NH_4CO_3$ for 17 days at 40° C.
- storage at 38-42° C.
- storage at 23-27° C.

Figure 5A:
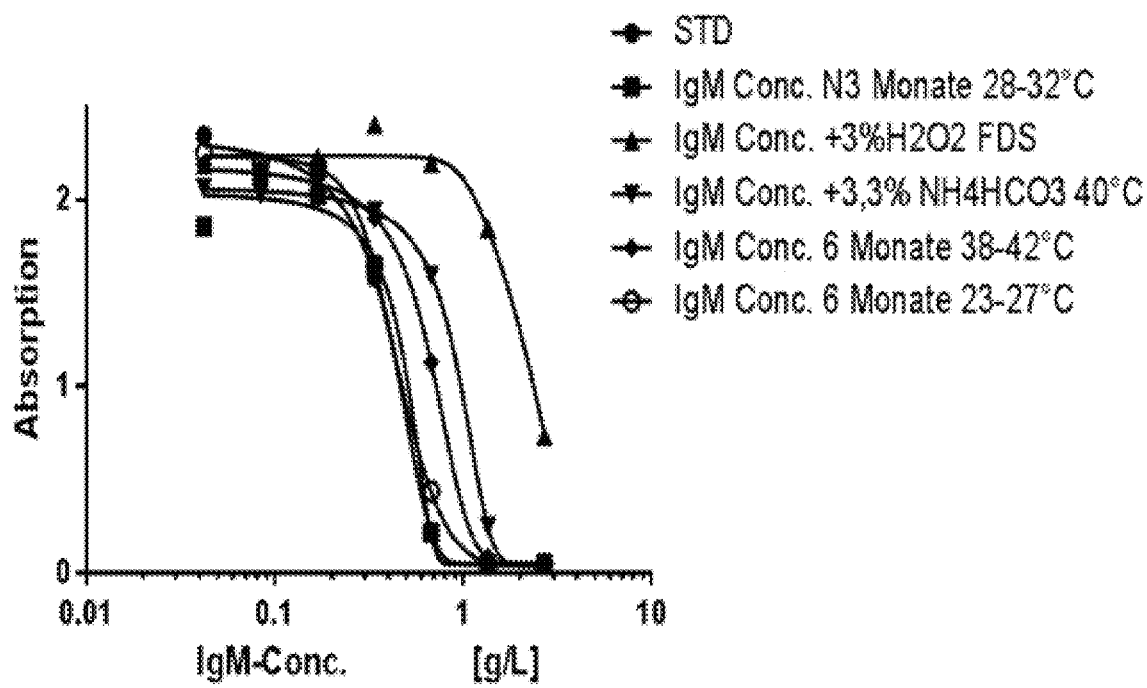
Figure 5B:
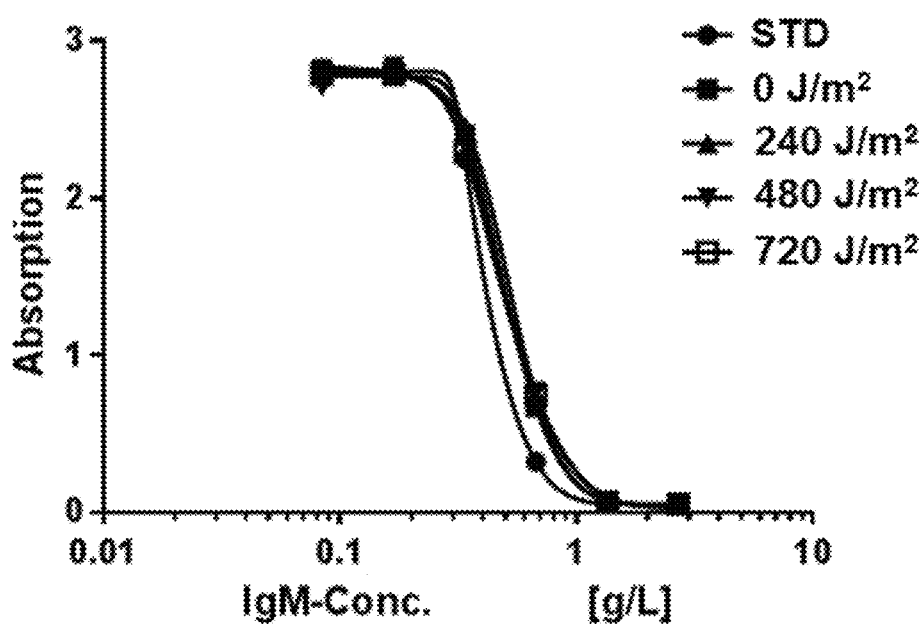

The results are provided in FIG. 5A.

The potencies of the treated and non-treated batches are provided in the table below.

TABLE 4

| Batch | Stress condition | Result Potency |
|---|---|---|
| Batch36 | Release value | 90.3% |
| Batch36 | 3 months at 23-27° C. | 89.9% |
| Batch36 | 6 months at 23-27° C. | 88.6% |
| Batch36 | 3 months at 38-42° C. | 71.2% |
| Batch36 | 4 months at 38-42° C. | 64.7% |
| Batch36 | 6 months at 38-42° C. | 55.4% |
| Batch16 | Release value | 67.3% |
| Batch16 | Treatment with 3% $H_2O_2$ | 19.2% |
| Batch16 | Treatment with 3.3% $NH_4HCO_3$ | 49.9% |

Furthermore, IgM composition from the same batch was irradiated with UV-C at 0 J/m$^2$, 240 J/m$^2$, 480 J/m$^2$ or 720 J/m$^2$. The results are provided in FIG. 5B, and the potencies are provided in the table below.

TABLE 5

| | UV-C dose [J/m$^2$] | | | |
|---|---|---|---|---|
| | 0 | 240 | 480 | 720 |
| Measurement 1 | 90.2% | 89.0% | 87.4% | 91.1% |
| Measurement 2 | 84.4% | 83.3% | 89.4% | 90.7% |
| Measurement 3 | 87.4% | 85.3% | 85.7% | 87.7% |
| Mean | 87.3% | 85.9% | 87.5% | 89.8% |
| SD | 2.37% | 2.36% | 1.51% | 1.52% |
| CV | 2.70% | 2.70% | 1.70% | 1.70% |

The experiment confirms decrease of potency both as a consequence of storage at higher temperatures for extended periods of time, and as a result of chemical stressors. 3% $H_2O_2$ increases aggregates and fragments and 3.3% $NH_4CO_3$ also increases fragments.

d) Comparison of Potency of IgM, IgG and IgA-Enriched Fractions

Fractions enriched for IgM, IgG and IgA and the standard IgM concentrates were prepared by Size-Exclusion-Chromatography followed by fractionation.

The resulting fractions comprise
71.7% IgM, 11.8% IgG and 16.5% IgA (IgM-enriched),
0% IgM, 100% IgG and 0% IgA (IgG-enriched) and
0% IgM, 39% IgG and 61% IgA (IgA-enriched),
compared to the reference standard IgM composition (Example 3) comprising 23% IgM, 56% IgG and 21% IgA.

FIG. 6 compares absorption results, detected according to the general method of Example 1, for fractions enriched for IgM, IgG and IgA and the standard. The potency of the IgM fraction is 0.213, the potency of the IgA fraction is 0.610 and the potency of the IgG fraction is 1.458.

Example 3: Manufacture of an kW Containing Immunoglobulin Composition

Human blood plasma for fractionation (2000 l) from more than 500 donors was used as starting material. The plasma was transferred to the pooling area and pooled.

A cryoprecipitation step was performed in order to separate coagulation factors such as Factor VIII, von Willebrand Factor, and Fibrinogen. In order to obtain the cryoprecipitate, the temperature of the plasma was adjusted under gentle stirring so that the temperature range was kept at 2±2° C. Under these conditions the cryoprecipitate remains undissolved in the thawed plasma. The cryoprecipitate was separated from the plasma by a continuously operating centrifuge such as a Westfalia separator.

From the supernatant of the cryoprecipitation step the Cohn fraction I/II/III was precipitated by ethanol precipitation as follows:

The temperature of the centrifugation supernatant remaining after separation of the cryoprecipitate was adjusted to 2±2° C. The protein solution was adjusted to pH 5.9. Subsequently, the temperature was lowered to −5° C. and ethanol was added to a final concentration of 20% by volume. Under constant slow stirring in a stainless steel vessel, Cohn Fraction I/II/III was precipitated. The Cohn Fraction I/II/III precipitate was separated from the supernatant by filtration with depth filter sheets under addition of filter aid such as Perlite or Diatomaceous Earth, using a filter press. The Cohn fraction I/II/III was recovered from the filter sheets. This Cohn fraction I/II/III precipitate comprised all immunoglobulins (IgG, IgA, IgM) in approximately the following percentages: 75% IgG, 13% IgM and 12% IgA.

90 kg of the obtained Cohn fraction I/II/III precipitate were resuspended in 450 kg of 0.1 M sodium acetate puffer pH 4.8 and mixed for 60 minutes at 22° C. The pH of the suspension was adjusted to 4.8 with acetic acid.

In the following a treatment with octanoic acid was performed. The solution was treated by addition of 7.7 kg octanoic acid at room temperature. The octanoic acid was added slowly and the protein solution was further mixed for 60 minutes, using a vibrating mixer (Vibromixer®, Size 4, Graber+Pfenniger GmbH, Vibromixer adjusted to level 2 3).

A calcium phosphate treatment was performed in order to complete the octanoic acid reaction as follows:

Approximately 1.1 kg $Ca_3(PO_4)_2$ were added and the protein solution was further mixed for more than 15 minutes and filtered over depth filter sheets. The filtrate was further processed. The obtained protein solution was subjected to ultrafiltration to a protein concentration of about 50 g/l. The protein solution was diafiltered against 0.02 M sodium acetate buffer pH 4.5 and afterwards adjusted to a protein concentration of about 40 g/l.

The protein solution was treated at pH 4.0 in order to inactivate viruses as follows: The pH was adjusted to pH 4.0 using 0.2 M HCl, and the resulting solution was incubated for 8 hours at 37° C. The resulting protein solution contains immunoglobulins with the following distribution: 90% IgG, 5% IgA, and 5% IgM.

The obtained protein solution was further processed by anionic exchange chromatography using a macroporous anion exchange resin in order to remove accompanying proteins and to obtain an IgG- and IgM-enriched immunoglobulin compositions. Per kilogram of the intermediate protein solution 0.00121 kg of tris(hydroxymethyl)aminomethane (Tris) were added and dissolved while stirring and the conductivity was adjusted to 6 mS/cm with solid NaCl. The protein solution was adjusted to pH 7.1 by adding 1 M NaOH. A macroporous anion exchange resin (POROS® 50 HQ anion exchange resin, Life Technologies, bed height of the column: 25 cm) was equilibrated with a 10 mM Tris buffer solution (pH 7.1, 50 mM NaCl, at a linear flow rate of 800 cm/h). The protein solution was loaded on the anion exchange resin with 40 g protein per liter of resin. The column was washed with the equilibration buffer (10 mM Tris, 50 mM NaCl, pH 7.1, at 800 cm/h).

An IgG-enriched immunoglobulin composition was obtained in the flow-through fraction and was further processed as described in Example 4 below.

An IgM-enriched fraction was eluted by increasing the conductivity as follows: 10 mM Tris buffer solution with 300 mM NaCl at pH 7.1 is used at 800 cm/h to elute the IgM-enriched fraction. The eluted fraction contained 58% IgG, 22% IgA and 20% IgM.

The protein solution was filtered through a Pall, Ultipor VF DV50 filter as a virus removal step. The filtrate was further processed by UVC light treatment at 254 nm, using a flow-through UVivatech process device (Bayer Technology Services/Sartorius) at a UVC dose of 225 $J/m^2$ for further virus inactivation. The flow velocity through the UVC reactor was calculated using the manufacturer's instructions. The irradiated protein solution was concentrated to a protein concentration of 50 g/l by ultrafiltration (and was subjected to diafiltration (using 0.3 M glycine buffer pH 4.5). The final product was filtered through a 0.2 µm filter and was stored at 2 to 8° C.

The obtained immunoglobulin composition had an IgM content of 22% by weight, an IgA content of 22% by weight and an IgG content of 56% by weight, based on the total immunoglobulin content, at an immunoglobulin concentration of 50 mg/ml. The ACA was 0.34 CH50/mg.

Example 4: Manufacture of a Purified IgG Containing Immunoglobulin Composition

The IgG-enriched immunoglobulin composition collected as the flow through fraction of the macroporous anion exchange chromatography (POROS® 50 HQ) in Example 3 was adjusted to pH 5.5 and to a conductivity of 22-26 mS/cm with sodium acetate buffer and NaCl and then was further purified by cation exchange chromatography in a flow-through mode on a cation exchange resin (POROS® 50 HS). The binding capacity of this resin is defined as 100-3000 g/l, and chromatography was carried out at a load of 3000 g/l and a flow-rate of 800 cm/h.

The cation exchange column was equilibrated with acetate buffer solution (pH 5.5, adjusted to 22-26 mS/cm with NaCl). The protein solution was loaded to the column and washed with acetate buffer (pH 5.5, adjusted to 22-26 mS/cm with NaCl). The flow through fraction and the wash are collected and further processed. The residual protein is eluted with 1.5 M NaCl.

The resulting protein solution was further processed by a nanofiltration step, in order to remove potentially present virus. A Planova BioEx 20 nm filter (Asahi Kasei) was used as a virus filter. More than 50 kg of the protein solution were filtered over a 0.1 $m^2$ filter area at a protein concentration of 10 g/l. The maximum pressure was set according to the manufacturer's instructions.

The resulting protein solution was subjected to a concentration step to >100 g/L by ultrafiltration and diafiltered into formulation buffer (0.3 M Glycine pH 5.0). The resulting protein solution was filtered through a 0.2 µm filter in order to control sterility.

The obtained immunoglobulin compositions were analysed for immunoglobulin contents, subclass distribution and ACA, and the results are shown in Table 1.

The invention claimed is:

1. A method for characterisation of potency and/or quality control of an immunoglobulin composition comprising at least 30 g/L immunoglobulin derived from a plurality of human donors, the method comprising
   a) contacting the immunoglobulin composition with pneumolysin,
   b) mixing erythrocytes with the immunoglobulin composition of step a) to obtain a mixture,
   c) determining lysis of erythrocytes, and
   d) determining the potency of said immunoglobulin composition from the amount of lysis of the erythrocytes.

2. The method of claim 1, wherein the immunoglobulin composition comprises IgG, IgM, IgA, or any combination thereof.

3. The method of claim 1, wherein the immunoglobulin composition is derived from plasma or serum.

4. The method of any of claim 1, wherein step a) is carried out at 37° C. for 15 min to 24 h.

5. The method of claim 1, wherein the erythrocytes are selected from a group consisting of human erythrocytes, sheep red blood cells, and rabbit red blood cells.

6. The method of claim 1, wherein the concentration is 1-4.5% (v/V) erythrocytes.

7. The method of claim 1, wherein the mixture of step b) is incubated at 37° C. for 5 min to 48 h.

8. The method of claim 1, wherein the lysis of the erythrocytes is determined by detecting the concentration of haemoglobin in a centrifugation supernatant of the mixture of step b) photometrically at 370-590 nm.

9. The method of claim 1, wherein the degree of lysis of the erythrocytes is inversely correlated to the potency of the immunoglobulin composition.

10. The method of claim 1, wherein the potency of the immunoglobulin composition is compared to the potency of a standard immunoglobulin composition, and the ratio of the potency of the immunoglobulin composition to the potency of the standard immunoglobulin composition is the relative potency.

11. A method for preparing a standardized immunoglobulin composition comprising at least 30 g/L immunoglobulins derived from a plurality of donors, comprising
   i. pooling plasma or serum derived from a plurality of human donors to provide a pool;
   ii. isolating and concentrating immunoglobulins from the pool to produce an immunoglobulin composition;
   iii. testing quality of the immunoglobulin composition of ii) by the method of claim 10, and
   iv. discarding said immunoglobulin composition if the relative potency of said immunoglobulin composition is not in a predetermined range,
   wherein the non-discarded immunoglobulin compositions are said standardized immunoglobulin compositions.

12. A kit comprising
   pneumolysin,
   an IgM-containing standard immunoglobulin composition comprising at least 30 g/L immunoglobulins derived from a plurality of human donors, preferably,
   a detergent, and
   a buffer in which erythrocytes are not lysed,
   wherein the kit further comprises erythrocytes.

13. A composition comprising a standard human immunoglobulin composition comprising about 23% IgM, about 56% IgG and about 21% IgA (w/total antibody w), and pneumolysin, wherein the composition further comprises erythrocytes.

14. The method of claim 2, wherein the percentage of IgM is 5-90% (w/total antibody w).

15. The method of claim 8, wherein the concentration is detected photometrically at about 405 nm.

16. The method of claim 10, wherein the standard immunoglobulin composition is a standard IgM-containing immunoglobulin composition.

17. The method of claim 11, further comprising adapting the potency of the immunoglobulin composition to a desired potency by modulating concentration of the immunoglobulin; and/or packaging an amount of the immunoglobulin composition having a desired potency.

18. The method of claim 11, wherein the predetermined range of the relative potency is 50-200%.

* * * * *